United States Patent
Maji et al.

(10) Patent No.: US 12,544,033 B2
(45) Date of Patent: Feb. 10, 2026

(54) SYSTEM AND METHOD FOR SMART SERVICING SMART SENSOR INTEGRATED COMPUTED TOMOGRAPHY IMAGING SYSTEMS

(71) Applicant: GE Precision Healthcare LLC, Wauwatosa, WI (US)

(72) Inventors: Goutam Maji, Bengaluru (IN); Sooraj A, Kollam (IN); Dhaval Pravinbhai Dangashiya, Ahmedabad (IN)

(73) Assignee: GE Precision Healthcare LLC, Waukesha, WI (US)

( * ) Notice: Subject to any disclaimer, the term of this patent is extended or adjusted under 35 U.S.C. 154(b) by 327 days.

(21) Appl. No.: 18/112,342

(22) Filed: Feb. 21, 2023

(65) Prior Publication Data
US 2024/0277309 A1   Aug. 22, 2024

(51) Int. Cl.
*A61B 6/00* (2024.01)
*A61B 6/03* (2006.01)
(Continued)

(52) U.S. Cl.
CPC ............. *A61B 6/586* (2013.01); *A61B 6/032* (2013.01); *A61B 6/0407* (2013.01);
(Continued)

(58) Field of Classification Search
CPC ......... A61B 6/032; A61B 6/035; A61B 6/586; A61B 6/548; A61B 6/102
See application file for complete search history.

(56) References Cited

U.S. PATENT DOCUMENTS

| | | |
|---|---|---|
| 8,613,546 B2 | 12/2013 | O'Connor et al. |
| 10,245,004 B2 | 4/2019 | Aasen |

(Continued)

FOREIGN PATENT DOCUMENTS

| | | |
|---|---|---|
| CN | 108042149 | 10/2014 |
| CN | 104076047 | 2/2018 |

(Continued)

OTHER PUBLICATIONS

JP2001190540_English Translation (Year: 2001).*
(Continued)

*Primary Examiner* — Dani Fox
(74) *Attorney, Agent, or Firm* — Fletcher Yoder, P.C.

(57) ABSTRACT

A computed tomography (CT) imaging system includes a gantry having a bore, rotatable about an axis of rotation. The CT imaging system also includes a table configured to move a subject to be imaged into and out of the bore of the gantry. The CT imaging system further includes a radiation source mounted on the gantry and configured to emit an X-ray beam. The CT imaging system even further includes one or more smart sensors integrated with one or more components of the CT imaging system, wherein the one or more smart sensors are configured to monitor for one or more conditions related to the CT imaging system. The CT imaging system still further includes a controller configured to receive feedback from the one or more smart sensors and to adjust scheduling of service on the CT imaging system based on the feedback from the one or more smart sensors.

15 Claims, 7 Drawing Sheets

(51) Int. Cl.

| | | |
|---|---|---|
| *A61B 6/04* | (2006.01) | |
| *A61B 6/58* | (2024.01) | |
| *G01J 5/00* | (2022.01) | |
| *G01M 3/04* | (2006.01) | |
| *G05B 23/02* | (2006.01) | |
| *G16H 40/40* | (2018.01) | |

(52) U.S. Cl.
CPC ............ *A61B 6/4435* (2013.01); *A61B 6/547* (2013.01); *G01J 5/0025* (2013.01); *G01M 3/04* (2013.01); *G05B 23/0283* (2013.01); *G16H 40/40* (2018.01)

(56) References Cited

U.S. PATENT DOCUMENTS

| | | |
|---|---|---|
| 10,512,443 B2 | 12/2019 | Smith et al. |
| 10,801,972 B2 | 10/2020 | Wuestenbecker |
| 2005/0281391 A1 | 12/2005 | Luo et al. |
| 2019/0266436 A1* | 8/2019 | Prakash ................ A61B 6/586 |
| 2020/0261049 A1 | 8/2020 | Hsieh et al. |

FOREIGN PATENT DOCUMENTS

| | | | |
|---|---|---|---|
| JP | 2001190540 A | * | 7/2001 |
| WO | 2014034540 A1 | | 3/2014 |
| WO | 2018020946 | | 5/2018 |

OTHER PUBLICATIONS https://info.origin.com.sg/ratsense-rodent-surveillance, (accessed 2022).
EP application 24158481.2 filed Feb. 19, 2024—partial Search Report issued Sep. 9, 2024; 13 pages.
JP2001190540 English Abstract; Espacenet.com Nov. 18, 2024; 1 page.
JP application 2024-017539 filed Feb. 8, 2024—Office Action issued Feb. 19, 2025; Machine Translation; 5 pages.

* cited by examiner

SYSTEM AND METHOD FOR SMART SERVICING SMART SENSOR INTEGRATED COMPUTED TOMOGRAPHY IMAGING SYSTEMS

BACKGROUND

The subject matter disclosed herein relates to imaging systems and, more particularly, to a system and a method for smart servicing smart sensor integrated computed tomography imaging systems.

In computed tomography (CT), X-ray radiation spans an object or a subject of interest being scanned, such as a human patient, baggage, or other object, and a portion of the radiation impacts a detector where the image data is collected. In digital X-ray systems a photodetector produces signals representative of the amount or intensity of radiation impacting discrete pixel regions of a detector surface. The signals may then be processed to generate an image that may be displayed for review. In the images produced by such systems, it may be possible to identify and examine the internal structures and organs within a subject's body. In CT imaging systems a detector array, including a series of detector elements or sensors, produces similar signals through various positions as a gantry is displaced around a subject or object being imaged, allowing volumetric image reconstructions to be obtained.

Servicing of CT imaging systems is very important to keep the CT imaging systems working as expected. Typically, servicing of a CT system is planned for every 3 or 4 months. However, this planned servicing does not take into account if a particular CT imaging system needs servicing sooner or if the particular CT imaging system can go longer without servicing (i.e., where the servicing would be unnecessary). Some CT imaging systems are used more often than other CT imaging systems. In addition, there are some potential conditions that servicing may not account for.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a computed tomography (CT) imaging system is provided. The CT imaging system includes a gantry having a bore, rotatable about an axis of rotation. The CT imaging system also includes a table configured to move a subject to be imaged into and out of the bore of the gantry. The CT imaging system further includes a radiation source mounted on the gantry and configured to emit an X-ray beam. The CT imaging system even further includes one or more smart sensors integrated with one or more components of the CT imaging system, wherein the one or more smart sensors are configured to monitor for one or more conditions related to the CT imaging system. The CT imaging system still further includes a controller configured to receive feedback from the one or more smart sensors and to schedule or to adjust scheduling of service on the CT imaging system based on the feedback from the one or more smart sensors.

In another embodiment, a system for monitoring and servicing a plurality of medical imaging systems is provided. The system includes a controller configured to be in communication with the plurality of medical imaging systems, wherein one or more smart sensors are integrated within one or more components of each medical imaging system of the plurality of medical imaging systems, and the one or more smart sensors are configured to monitor for one or more conditions related to a respective medical imaging system. The controller includes memory encoding processor-executable routines. The controller also includes a processor configured to access the memory and to execute the processor-executable routines, wherein the routines, when executed by the processor, cause the processor to perform acts. The acts include receiving feedback from the one or more sensors of each medical imaging system. The acts also include scheduling or adjusting scheduling of service for each medical imaging system based on respective feedback received from the one or more smart sensors of each respective medical imaging system.

In a further embodiment, a method for monitoring and servicing a plurality of medical imaging systems is provided. The method includes receiving, at a processor, feedback from one or more smart sensors of each medical imaging system of the plurality of medical imaging systems, wherein the one or more smart sensors of each medical imaging system are integrated within one or more components of a respective medical imaging system, and the one or more smart sensors are configured to monitor for one or more conditions related to the respective medical imaging system. The method also includes scheduling or adjusting scheduling, via the processor, of service for each medical imaging system based on respective feedback received from the one or more smart sensors of each respective medical imaging system.

BRIEF DESCRIPTION OF THE DRAWINGS

These and other features, aspects, and advantages of the disclosed subject matter will become better understood when the following detailed description is read with reference to the accompanying drawings in which like characters represent like parts throughout the drawings, wherein.

DETAILED DESCRIPTION

Figure 1:
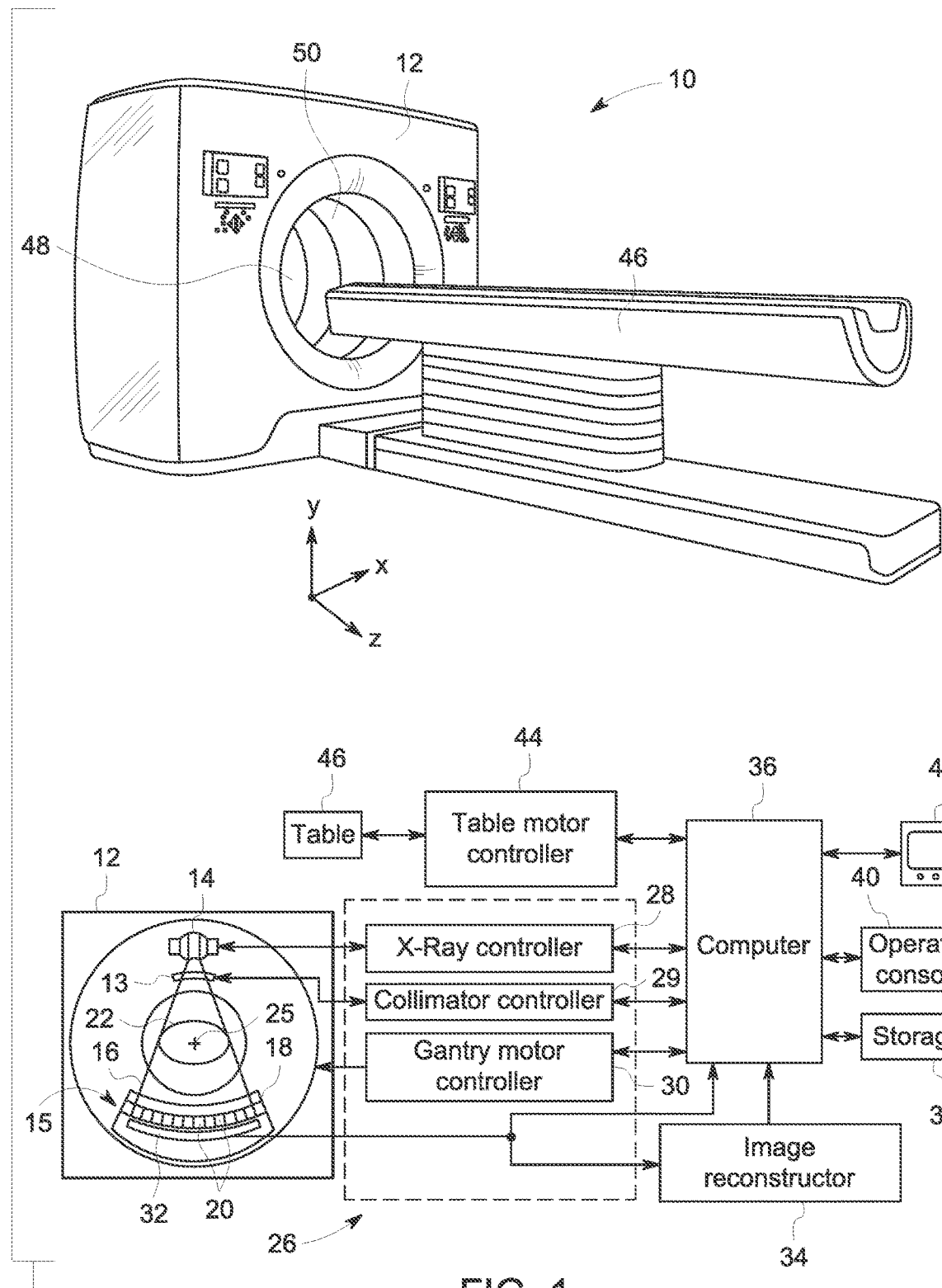
FIG. 1 is a combined pictorial view and block diagram of a computed tomography (CT) imaging system as discussed herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While aspects of the following discussion may be provided in the context of medical or health care imaging, it should be appreciated that the present techniques are not limited to such medical contexts. Indeed, the provision of examples and explanations in such a medical context is only to facilitate explanation by providing instances of real-world implementations and applications. However, the present approaches may also be utilized in other contexts, such as tomographic image reconstruction for industrial CT used in non-destructive inspection of manufactured parts or goods (i.e., quality control or quality review applications), and/or the non-invasive inspection of packages, boxes, luggage, and so forth (i.e., security or screening applications). In general, the present approaches may be useful in any imaging or screening context utilizing a CT imaging system.

At present, CT systems (and other medical imaging systems) are serviced periodically at fixed time intervals without having much prior knowledge of a system condition. In this scenario, medical imaging systems that have been used less since their last periodic maintenance and that are still working fine will still be serviced by a field engineer as is planned even when no service is needed. This results in overhead cost to the customer and unnecessary downtime for the imaging system for the periodic maintenance when the customer may have a busy schedule for the utilization of the imaging system. It is also not effective for the service provider to utilize available resources for periodic maintenance that is not required. In another scenario, a potential condition may start to develop with a medical imaging system prior to the scheduled preventive maintenance that may be avoided with proactive (and earlier than scheduled) maintenance or service.

The present disclosure provides embodiments for a system and a method for smart servicing smart sensor integrated CT imaging systems (or other medical imaging systems). In particular, a plurality of CT imaging systems is coupled to a controller (e.g., centralized controller located remotely from each of the CT imaging systems). Each CT imaging system includes one or more smart sensors (i.e., a device that takes input from the physical environment and uses built-in compute resources to perform predefined functions upon detection of specific input and then process data before passing it on) integrated with one or more components of the CT imaging system. The one or more smart sensors are configured to monitor for one or more conditions related to the CT imaging system. In certain embodiments, a respective CT imaging system may include multiple smart sensors of different types configured to measure different conditions. For examples, the smart sensors may include one or more of a dust accumulation sensor to measure an accumulation of dust, a smoke sensor to detect a presence of smoke, a fire sensor to detect a presence of a flame, an animal presence sensor to detect a presence of an animal, an oil leak sensor to detect a presence of an oil leak, digital inclinometers to determine if a gantry housing and/or table are level relative to a surface where the CT imaging system is located on, and vibration sensors (e.g., accelerometers) to detect excessive vibration in CT imaging system components (e.g., gantry). The smart sensors may be located on or within the various components of the CT imaging system (e.g., gantry, gantry housing, table, etc.). The smart sensors may provide feedback (e.g., signals) of the one or more conditions directly to the controller or indirectly (e.g., via a respective operator console of the CT imaging system) to the controller. The controller may utilize this feedback to schedule or to adjust scheduling of service (e.g., maintenance) for each CT imaging system based on the respective feedback received from each CT imaging system. In certain embodiments, the servicing or maintenance may be scheduled as needed as opposed at a fixed interval. In certain embodiments, the controller may predict potential failure of a specific component of a particular CT imaging system based on the respective feedback from the smart sensors integrated with the CT imaging system and schedule the service or maintenance to replace the specific component prior to the potential failure of the specific component.

The disclosed embodiments enable providing smart maintenance instead of periodic maintenance. The disclosed embodiments also provide reduced service cost and less downtime for each CT imaging system. The disclosed embodiments further include providing monitoring and service (or maintenance) scheduling at a centralized location. The centralized monitoring location will have access to the system using data and part failure data which will enable better troubleshooting in case any or additional parts fail. The disclosed embodiments even further enable a service provider to more effectively manage resources for servicing a plurality of CT imaging systems.

Although the following discusses the disclosed embodiments with regard to CT imaging systems, the techniques described herein may apply to other types of imaging systems. For example, the disclosed techniques may apply to a magnetic resonance imaging (MRI) system or a nuclear medicine imaging system such as positron emission tomography (PET) imaging system or single photon emission computed tomography (SPECT) system. The disclosed techniques may also apply to a medical imaging systems having a combination of the above medical imaging modalities. For example, one or more smart sensors may be integrated with one or more components (e.g., gantry, gantry housing, table, etc.) of these medical imaging systems as well.

With the preceding in mind and referring to FIG. 1, a computed tomography (CT) imaging system 10 is shown, by way of example. As discussed in greater detail below, one or more smart sensors may be integrated within one or more components of the CT imaging system 10 to monitor one or more conditions related to the CT imaging system. Feedback from these smart sensors are provided to a controller (e.g., centralized or remote controller), where the controller schedules or adjusts scheduling of service or maintenance to be performed on the CT imaging system 10. The CT imaging system 10 includes a gantry 12. The gantry 12 has an X-ray source 14 that projects a beam of X-rays 16 toward a detector assembly 15 on the opposite side of the gantry 12. The X-ray source 14 projects the beam of X-rays 16 through a pre-patient collimator assembly 13 that determines the size and shape of the beam of X-rays 16. The detector assembly 15 includes a collimator assembly 18 (a post-patient collimator assembly), a plurality of detector modules 20 (e.g., detector elements or sensors), and data acquisition systems (DAS) 32. The plurality of detector modules 20 detect the projected X-rays that pass through a subject or object 22 being imaged, and DAS 32 converts the data into digital signals for subsequent processing. Each detector module 20 in a conventional system produces an analog electrical signal that represents the intensity of an incident X-ray beam and hence the attenuated beam as it passes through the subject or object 22. During a scan to acquire X-ray projection data, gantry 12 and the components mounted thereon rotate about a center of rotation 25 (e.g., isocenter) so as to collect attenuation data from a plurality of view angles relative to the imaged volume.

Rotation of gantry 12 and the operation of X-ray source 14 are governed by a control system 26 of CT imaging system 10. Control system 26 includes an X-ray controller 28 that provides power and timing signals to an X-ray source 14, a collimator controller 29 that controls a length and a width of an aperture of the pre-patient collimator 13 (and, thus, the size and shape of the beam of X-rays 16), and a gantry motor controller 30 that controls the rotational speed and position of gantry 12. An image reconstructor 34 receives sampled and digitized X-ray data from DAS 32 and performs high-speed image reconstruction. The reconstructed image is applied as an input to a computer 36, which stores the image in a storage device 38. Computer 36 also receives commands and scanning parameters from an operator via console 40. An associated display 42 allows the operator to observe the reconstructed image and other data from computer 36. The operator supplied commands and parameters are used by computer 36 to provide control signals and information to DAS 32, X-ray controller 28, collimator controller 29, and gantry motor controller 30. In addition, computer 36 operates a table motor controller 44, which controls a motorized table 46 to position subject 22 and gantry 12. Particularly, table 46 moves portions of subject 22 through a gantry opening or bore 48.

Figure 2:
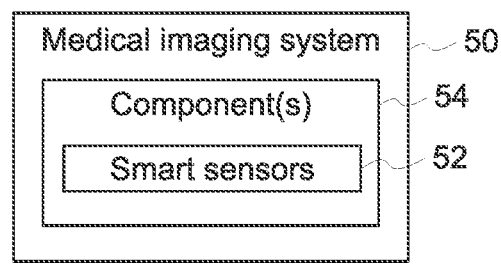
FIG. 2 is a schematic diagram of a medical imaging system having integrated smart sensors, in accordance with aspects of the present disclosure.

FIG. 2 is a schematic diagram of a medical imaging system 50 having integrated smart sensors 52. The medical imaging system 50 may be a CT imaging system (e.g., CT imaging system 10 in FIG. 1), an MRI imaging system (e.g., MRI imaging system 200 in FIG. 10), or a nuclear medicine imaging system (e.g., nuclear medicine imaging system 1000 in FIG. 11). In certain embodiments, the medical imaging system 50 may be combination of these types of imaging modalities. As depicted, the medical imaging system 50 includes one or more components 54 having smart sensors 52 integrated with them. In certain embodiments, the smart sensor 52 is coupled to the component 54. In certain embodiments, the smart sensor 52 is disposed within the component 54. In certain embodiments, a single smart sensor 52 may be integrated with a particular component 54. In certain embodiments, multiple smart sensors 52 of a same type or different types (i.e., for measuring or detecting a different condition) may be integrated with a particular component 54. In certain embodiments, a single component 54 of the medical imaging system 50 may have integrated one or more smart sensors 52 (of a same type and/or different types). In certain embodiments, multiple components 54 of the medical imaging system 50 may have integrated one or more smart sensors 52 (of a same type and/or different types). Examples of components 54 of the medical imaging system 50 that may have one or more smart sensors 52 integrated include a gantry, a gantry housing, an X-ray source (e.g., X-ray tube), a power distribution unit, a table, or any other component 54. The component 54 may be part of a sub-system of the medical imaging system 50.

Figure 3:
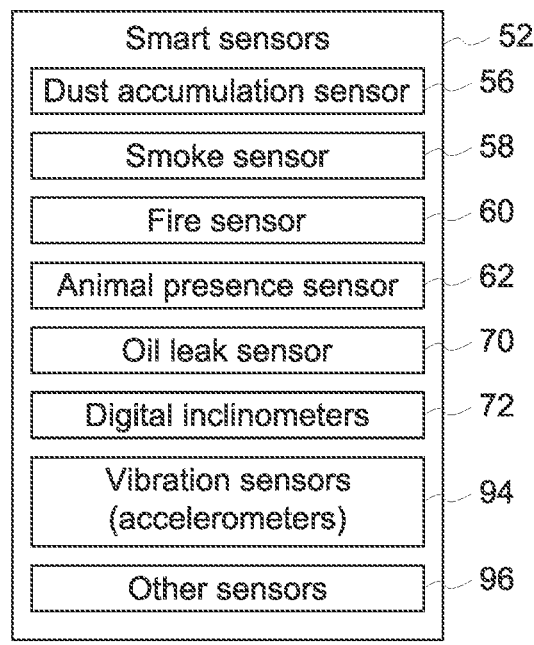
FIG. 3 is a schematic diagram of types of smart sensors to be integrated within a medical imaging system, in accordance with aspects of the present disclosure.

FIG. 3 is a schematic diagram of types of smart sensors 52 to be integrated within the medical imaging system (e.g., medical imaging system 50) in FIG. 2. The smart sensors 52 include a dust accumulation sensor 56. Excessive dust inside the medical imaging system can cause early part failure (e.g., conductive dust can reduce clearance between two high voltage points and causes short circuit failure in printed circuit boards). Dust in medical imaging system can be due to external and/or internal reasons or sources. Examples of external reasons include the scan room (where the medical imaging system is located) may be dusty and not cleaned regularly, patients are entering the scan room with shoes, and/or a patient entry door does not include any curtains. An example of an internal reason may be that higher system usage causes slip ring carbon brush-tips getting rubbed causing carbon deposition on the slip rings and the surrounding area.

The dust accumulation sensor 56 is configured to measure an accumulation of dust. In certain embodiments, the dust accumulation sensor 56 is configured to compare the measurement to a predefined dust accumulation threshold and to provide an alert signal to the centralized controller (e.g., indirectly via an operator console of the medical imaging system in communication with the centralized controller or directly) and/or the operator console coupled to the medical imaging system when the accumulation of the dust exceeds the predefined dust accumulation threshold. In certain embodiments, the dust accumulation sensor 56 measures the dust accumulation and the centralized controller (or respective operator console) does the comparison to the dust accumulation threshold and generation of an alert (once the dust accumulation exceeds the predefined dust accumulation threshold). The dust accumulation sensor mitigates potential risks the dust may cause to the medical imaging system or sub-system of the medical imaging system. Tracking and understanding dust accumulation patterns in real-time enables proactive service (or maintenance) and utilizes resources more efficiently. The dust accumulation sensor 56 may be disposed within the gantry housing, the patient table, and/or a power distribution unit of the medical imaging system to detect dust on parts and surfaces.

The dust accumulation sensor 56 may be any type of dust accumulation sensor. In certain embodiments, the dust accumulation sensor 56 may be an optical sensing sensor to detect dust accumulation. For example, the dust accumulation sensor 56 may include a photosensor and an infrared light-emitting diode (IR LED) that are optically arranged in a dust sensor module. The photosensor detects the reflected IR LED rays which are bounced off of the dust particles in the air.

The smart sensors 52 also include a smoke sensor 58 and a fire sensor 60. In certain embodiments, the medical imaging system includes both the smoke sensor 58 and the fire sensor 60. The smoke sensor 58 and/or the fire sensor 60 may be disposed within the gantry housing of the medical imaging system. Certain fault conditions can cause fire and smoke in the medical imaging system. The smoke sensor 58 is configured to detect a presence of smoke. The fire sensor 60 is configured to detect a presence of a flame (which is indicative of fire). The smoke sensor 58 is configured to provide an alert signal to the centralized controller (e.g., indirectly via an operator console of the medical imaging system in communication with the centralized controller or directly) and/or the operator console coupled to the medical imaging system when the presence of smoke is detected. Also, the fire sensor 60 is configured to provide an alert signal to the centralized controller (e.g., indirectly via an operator console of the medical imaging system in communication with the centralized controller or directly) and/or the operator console coupled to the medical imaging system when the presence of a flame is detected. In certain embodiments, the centralized controller is configured to provide a signal (e.g., to the operator console of the medical imaging system) to cause the medical imaging system to be turned off in response to the alert signal from either the smoke sensor 58 and/or the fire sensor 60. In certain embodiments, the operator console of the medical imaging system (prior to communication with the centralized controller) may turn off the medical imaging system in response to the alert signal from either the smoke sensor 58 and/or the fire sensor 60. Early detection of fire and smoke can result in shutting down the medical imaging system immediately and avoiding catastrophic failure (via the communication with the centralized controller), thus, ensuring safety.

In certain embodiments, the smoke sensor 58 may be a gas sensor. For example, the smoke sensor may be MQ2 gas sensor module configured to sense liquefied petroleum gas, smoke, alcohol, propane, hydrogen, methane, and carbon monoxide concentrations in the air. The MQ2 gas sensor module is a metal oxide semiconductor type gas sensor known as a chemiresistors where detection is based upon change of resistance of the sensing material when the gas comes in contact with the sensing material. Using a simple voltage divider network, concentrations of gas can be detected.

In certain embodiments, the fire sensor 60 is a small size electronics device that can detect a fire source or any other bright light sources. The fire sensor 60 is configured to detect infrared light wavelengths between 760 nanometers (nm) and 1100 nm that are emitted from the flame of the fire or light source.

The smart sensors 52 further include an animal presence sensor 62. It has been observed that sometimes rodents enter into the medical imaging system which may cause a short circuit in a sub-system (e.g., slip ring brush block) and, thus, failure in the medical system. To avoid this, it is important to have the animal presence sensor 62 inside the medical imaging system to identify rodent (or other animal such as an insect) entry inside the medical imaging system (e.g., gantry housing) and take necessary actions. In certain embodiments, the animal presence sensor 62 is disposed inside the gantry housing of the medical imaging system. The animal presence sensor 62 is configured to detect a presence of an animal (e.g., rodent, insect, etc.) within the component of the medical imaging system and to initiate a trigger (e.g., alert signal or deterrent action). In certain embodiments, the animal presence sensor 62 is configured to provide an alert signal to the centralized controller (e.g., indirectly via an operator console of the medical imaging system in communication with the centralized controller or directly) and/or the operator console coupled to the medical imaging system when the presence of an animal is detected.

In certain embodiments, the animal presence sensor 62 is a motion sensor. For example, the animal presence sensor 62 may be a passive infrared motion sensor configured to detect movement of the animal within the component of the medical imaging system and to initiate a trigger. The passive infrared motion sensor may be configured to detect infrared radiation through two slots. When an animal passes in front of the motion sensor, one of the two slots detects movement first, creating a detectable differential. Humans, animals, and even inanimate objects emit a certain amount of infrared radiation. The amount of infrared radiation they emit relates to the body or object's warmth and material composition. By placing the passive infrared sensor inside the component of the medical imaging system, it can detect the presence of the animal by which it can trigger an alarm signal or a deterrent.

Figure 4:
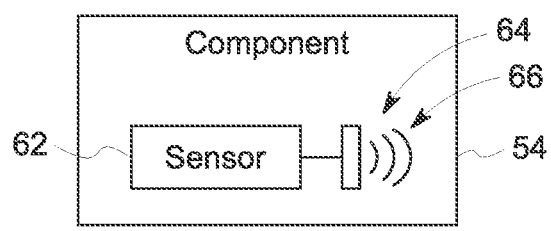
FIG. 4 is a schematic diagram of an animal presence sensor coupled to a deterrent system (e.g., ultrasound sensor), in accordance with aspects of the present disclosure.
Figure 5:
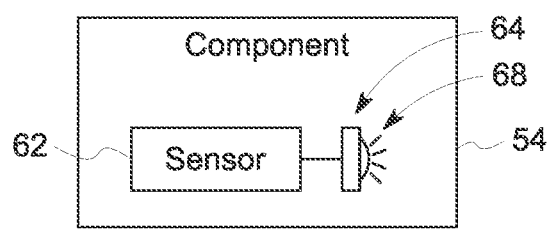
FIG. 5 is a schematic diagram of an animal presence sensor coupled to a deterrent system (e.g., light source), in accordance with aspects of the present disclosure.

In certain embodiments, the animal presence sensor 62 may be disposed within a component 54 (e.g., gantry housing) and coupled to and/or in communication (e.g., indirectly via the operator console or directly) with a deterrent system 64 as depicted in FIGS. 4 and 5. The deterrent system 64 is configured to provide to produce a deterrent to cause the animal to leave the component 54 of the imaging system. In certain embodiments, the deterrent system 64 includes an ultrasound transducer 66 (as depicted in FIG. 4) configured to emit ultrasound waves which can repel the animals (e.g., rodents). Rodents do not like any noise greater than 20 kilohertz (kHz). These high-intensity waves cause irritation due to the rodents having sensitive ears. Sound with a frequency of more than 20 kHz is called ultrasound. It is too high pitched for humans to hear. Humans can detect sounds in a frequency range from about 20 Hz to 20 kHz. In certain embodiments, the deterrent system 64 is configured to emit light from a light source 68 (as depicted in FIG. 5) that drives off the animal.

Returning to FIG. 3, the smart sensors 52 even further include an oil leak sensor 70. The oil leak sensor 70 is configured to detect a presence of an oil leak in a component of the medical imaging system. In certain embodiments, the oil leak sensor 70 is disposed within a gantry housing (e.g., front cover and/or bottom). In certain embodiments, the oil leak sensor 70 may be disposed about a radiation source (e.g., X-ray tube). In certain embodiments, the oil leak sensor 70 is configured to provide an alert signal to the centralized controller (e.g., indirectly via an operator console of the medical imaging system in communication with the centralized controller or directly) and/or the operator console coupled to the medical imaging system when the presence of an oil leak is detected.

In certain embodiments, the oil leak sensor 70 is an optically-based sensor. For example, the oil leak sensor 70 that has a mode of operation based on the principle of total internal reflection. For example, the oil leak sensor 70 may include a light emitting diode (LED) and a phototransistor are housed in a plastic (e.g., polysulfone) dome. When no liquid is present, light from the LED is internally reflected from the dome to the phototransistor. When a liquid covers the dome, the effective refractive index at the dome-oil boundary changes allowing some light from the LED to escape. Thus, the amount of light received by the phototransistor is reduced indicating the presence of a liquid (e.g., oil).

In certain embodiments, the oil leak sensor 70 is an oil leak sensing cable. The oil leak sensing cable is configured to detect leaks of liquid hydrocarbon on its entire length. The core of the cable is composed of a bundle of wires formed into a spiral construction. For example, hydrocarbon detection is via a sensing element which is a coaxially extruded silicone jacket element containing carbon black. The black wire swells by quickly absorbing liquid hydrocarbon (lubrication oil or petroleum products). The outer layer of the black sensor wire is a watertight electrical insulator, which is permeable for liquid hydrocarbon only. As the conductor swells, an integral microprocessor monitors for resistance. Once that resistance threshold is achieved, a leak response will be transmitted to the controller. This process is reversible meaning the cable can be reused after cleaning. The silicon polymer, which is different from other forms of polymer, has a strong resistance to hydrocarbon, thus, the cable returns to its initial status after cleaning with no impact on the sensor's reliability.

Figure 6:
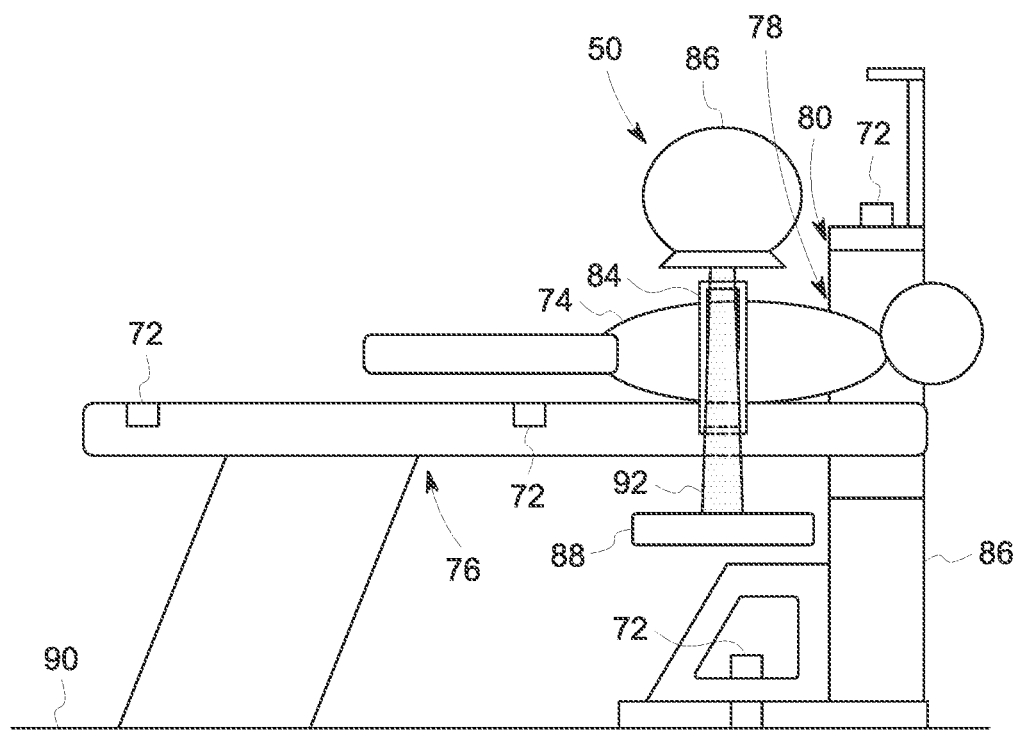
FIG. 6 is a schematic diagram of imaging of a patient with components of the medical imaging system correctly leveled (e.g., due to digital inclinometers), in accordance with aspects of the present disclosure.
Figure 7:
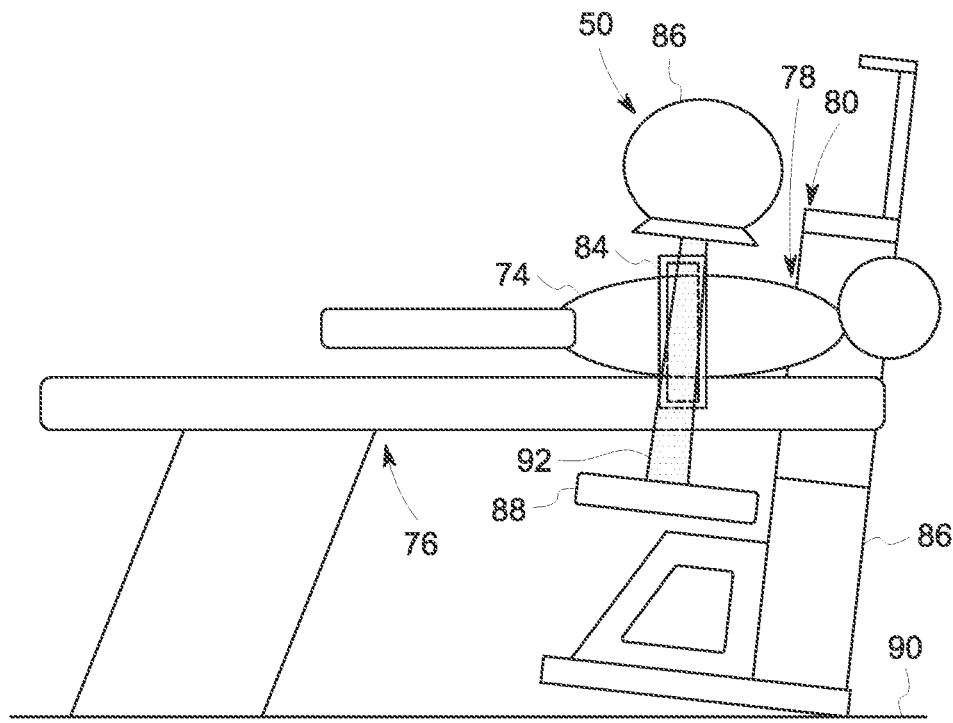
FIG. 7 is a schematic diagram of imaging of a patient with components of the medical imaging system incorrectly leveled (e.g., due to the absence of digital inclinometers), in accordance with aspects of the present disclosure.

The smart sensors 52 yet further include digital inclinometer sensors 72. At present, gantry (e.g., gantry housing) and table horizontal leveling is achieved by manual adjustment through a spirit bubble leveler. This is labor skill dependent and a cumbersome activity. Many times, leveling is not achieved properly due to the absence of a perfect indication available on the spirit bubble leveler which confirms the accurate leveling of the gantry housing and table. Perfect examination planning (reference marking) with respect to the patient's body is critical in CT guided biopsy. Misalignment due to improper leveling causes inaccurate examination planning of the patient anatomy which results in performing the medical imaging again. FIGS. 6 and 7 illustrate a patient 74 disposed on a table 76 and placed in a bore 78 of a gantry 80 (disposed within a gantry housing 82) undergoing an imaging scan via the medical imaging system 50 (e.g., CT imaging system) on an intended region 84 of the patient's anatomy (e.g., disposed between a radiation source 86 and a detector 88). In FIG. 6, due to the presence of the digital inclinometers 72, both the table 76 and the gantry 80 (and the gantry housing 82) are level relative to a surface 90 that the medical imaging system 50 is located on. Thus, the X-ray beam 92 is properly aligned with the intended region 84 being examined. In FIG. 7, the table 76 and/or the gantry 80 (and the gantry housing 82) are not leveled correctly relative to the surface 90. Thus, the X-ray beam is misaligned with respect to intended region being examined, which means the patient 74 will need to be re-examined with the medical imaging system 50.

As depicted in FIG. 6, integration of the digital inclinometer sensor 72 enables the user or operator to ensure an accurate gantry-table leveling by intuitive indication through a calibrated system interface. In certain embodiments, one or more digital inclinometer sensors 72 are configured to determine if the gantry 80 (and gantry housing 82) and/or the table 76 are level relative to the surface 90 where the medical imaging system 50 is located. In certain embodiments, one or more digital inclinometer sensors 72 are coupled to (e.g., integrated on) and/or disposed within the gantry 80 and/or gantry housing 82) as depicted in FIG. 6. In certain embodiments, one or more digital inclinometer sensors 72 are coupled to (e.g., integrated on) and/or disposed within the table 76 as depicted in FIG. 6. In certain embodiments, one or more digital inclinometer sensors 72 are coupled to (e.g., integrated on) and/or disposed within the gantry 80 and/or the gantry housing 82 and the table 76. The digital inclinometer sensors 72 are configured to provide an alert signal to the centralized controller (e.g., indirectly via an operator console of the medical imaging system 50 in communication with the centralized controller or directly) and/or the operator console coupled to the medical imaging system 50 in response to determining the gantry housing 82 (and, thus, gantry 80) and/or the table 76 are not level relative to the surface 90. In certain embodiments, if the alert signal is provided prior to the imaging scan, the controller (or operator console) may provide a signal to cause a halt or pause of the scan and/or provide an indication (e.g., on the operator console of the medical imaging system 50) that one or more the components (e.g., the gantry housing 82 or the table 76) is not level relative to the surface 90.

Returning to FIG. 3, the smart sensors 52 still further include vibration sensors 94. In certain embodiments, the vibration sensors 94 include accelerometers. One or more vibration sensors 94 may be coupled to one or more components of medical imaging system (e.g., gantry, gantry housing, or a part within the gantry or gantry housing). The vibrations sensors 94 may be utilized at specific locations of the medical imaging system for different use case scenarios. For example, the vibration sensors 94 may be utilized for dynamic and static balance for verification for a gantry after replacement of any component on a rotating gantry during maintenance. In another scenario, the vibration sensors 94 may provide data to machine learning modules to be utilized for predictive maintenance (e.g., foreseeable failure of any component due to any system or sub-system abuse, misbehavior, and/or overuse. In a further scenario, the vibration sensors 94 may provide data for fault diagnosis via a signal processing algorithm and component level root cause identification (e.g., whether the failure is due to a bearing, tube, pulley drive system, etc.). In an even further scenario, the vibration sensors 94 may provide an alert signal to the centralized controller (e.g., indirectly via an operator console of the medical imaging system in communication with the centralized controller or directly) and/or the operator console coupled to the medical imaging system in response to detecting excessive vibration being transferred to the gantry from its surrounding (which may to inferior image quality due to vibration induced artifacts and/or the need to perform the imaging scan again).

The smart sensors 52 may even further include other sensors 96. For example, the smart sensors 52 may include temperature sensors, humidity sensors, or other types of sensors to provide data related to the medical imaging system.

Figure 8:
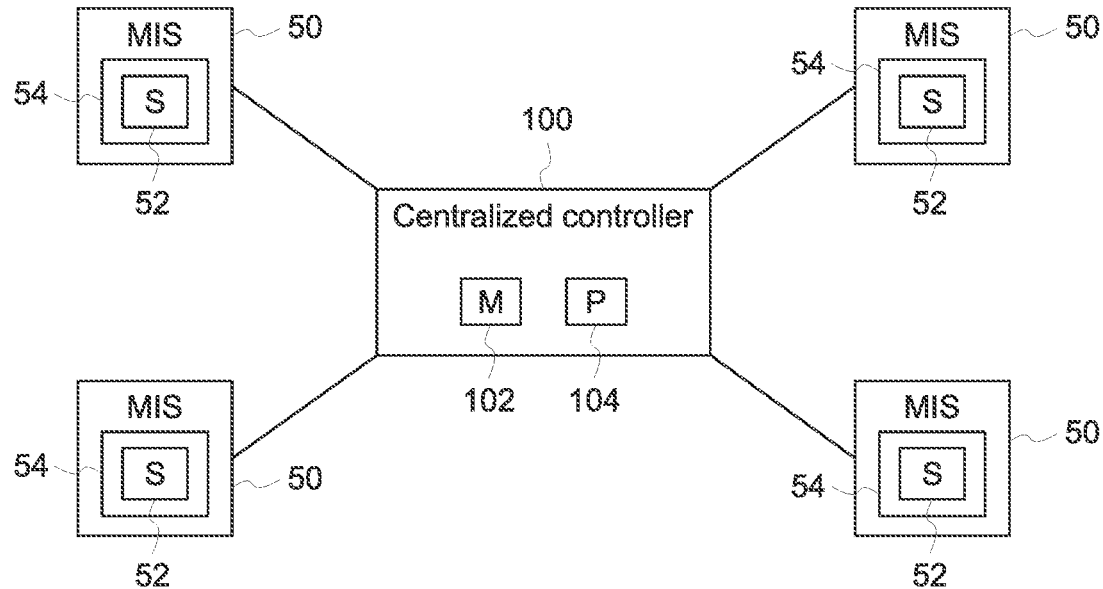
FIG. 8 is a schematic diagram of a system for monitoring and servicing a plurality of medical imaging systems, in accordance with aspects of the present disclosure.

FIG. 8 is a schematic diagram of a system 98 for monitoring and servicing of a plurality of medical imaging systems (MIS) 50. The system 98 includes a remote computing device or centralized controller 100 in communication with the plurality of medical imaging systems 50. The centralized controller 100 is located remotely from each of the medical imaging systems 50. In certain embodiments, the medical imaging systems 50 communicatively coupled with the centralized controller 100 are of the same imaging modality. In certain embodiments, the medical imaging systems 50 communicatively coupled with the centralized controller 100 are of different imaging modalities. The smart sensors 52 of each medical imaging system 50 are configured to communicate with the centralized controller 100 (e.g., indirectly via an operator console of the medical imaging system 50 in communication with the centralized controller 100 or directly). In certain embodiments, another computing device may serve as an intermediary for communication between the centralized controller 100 and a respective medical imaging system 50.

The centralized controller 100 may include a memory 102 and a processor 104. In some embodiments, the processor 104 may include one or more general purpose processors, one or more application specific integrated circuits, one or more field programmable gate arrays, or the like. Additionally, the memory 102 may be any tangible, non-transitory, computer readable medium that is capable of storing instructions (e.g., related to near-plug monitoring, product metering, fan control, etc.) executable by the processor 104 and/or data that may be processed by the processor 104. In other words, the memory 102 may include volatile memory, such as random-access memory, or non-volatile memory, such as hard disk drives, read only memory, optical disks, flash memory, and the like. The memory 102 may store data collected from the smart sensors 52 of the plurality of medical imaging systems 50. The memory 102 may also store various thresholds associated with particular parameters or conditions measured by the smart sensors 52. The memory 102 may further store machine learning modules utilized in predicting the failure of parts or components within the medical imaging systems 50. The memory 102 even further stores schedules for the servicing or maintenance of the medical imaging systems 50.

The centralized controller 100 is configured to receive feedback from the smart sensors 52 of each medical imaging system 50. In certain embodiments, the centralized controller 100 is configured to receive alert signals from the smart sensors 52. In certain embodiments, the centralized controller 100 is configured to generate the alert signals based on the feedback received from the respective smart sensors 52 of a respective medical imaging system 50 and to provide an indication of the alert signal to an operator console of the respective medical imaging system 50 or another computing device (e.g., of the facility that has the respective medical imaging system 50). In certain embodiments, the centralized controller 100 is configured to provide a signal to cause a respective imaging system to shut down based on the feedback received from the respective smart sensors 52 of the respective medical imaging system 50. The centralized controller 100 is also configured to schedule or adjust scheduling of service or maintenance of each medical imaging system 50 based on the respective feedback received from the smart sensors 52 associated with each medical imaging system 50. In certain embodiments, the centralized controller 100 is configured to predict failure of a specific component or part of a respective medical imaging system 50 based on the feedback received from the respective smart sensors 52 of the respective medical imaging system 50 and to schedule the service or maintenance to replace the specific component or part prior to its failure.

Figure 9:
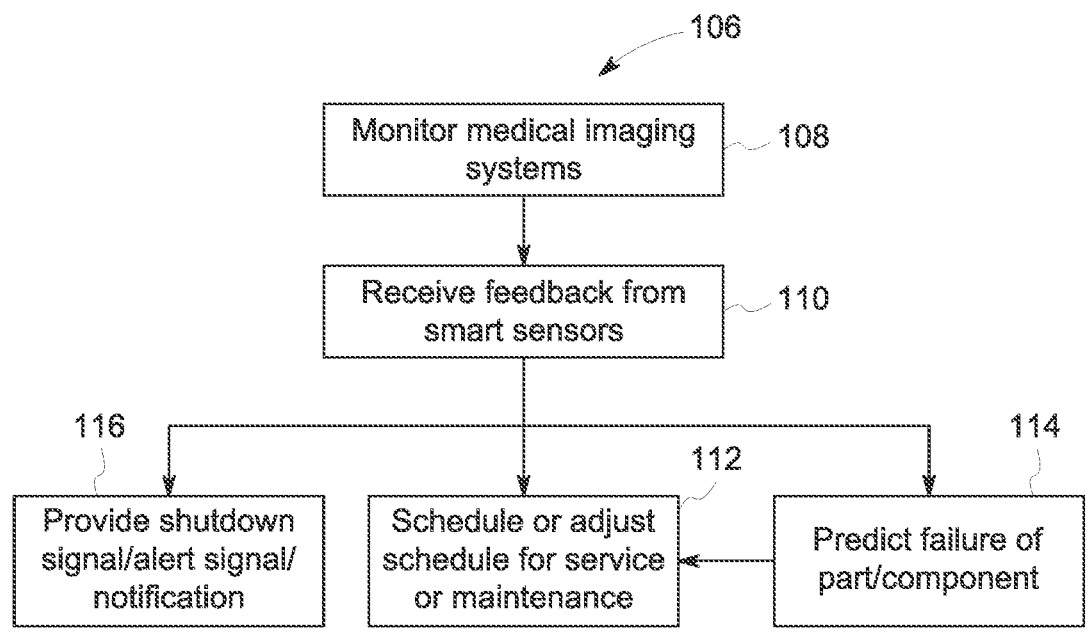
FIG. 9 is a method for monitoring and servicing a plurality of medical imaging systems, in accordance with aspects of the present disclosure.

FIG. 9 is a method 106 for monitoring and servicing a plurality of medical imaging systems (e.g., medical imaging systems 50 in FIG. 2). The method 106 may be performed by a remote computing device or a centralized controller (e.g., centralized controller 100 in FIG. 8) separate or remote from the medical imaging systems. One or more of the steps of the method 106 may be performed simultaneously and/or in a different order from that depicted in FIG. 9.

The method 106 includes monitoring a plurality of medical imaging systems (block 108). The plurality of medical imaging systems is communicatively coupled to the remote computing device or centralized controller. As described above, one or more smart sensors are integrated within one or more components of each medical imaging system of the plurality of medical imaging systems. The one or more smart sensors are configured to monitor for one or more conditions or parameters (e.g., dust accumulation, smoke, fire, oil leaks, vibration, gantry-table leveling, animal presence, etc.) for or related to a respective medical imaging system.

The method 106 also includes receiving feedback from the respective one or more smart sensors of each medical imaging system (block 110). In certain embodiments, the feedback from the smart sensors is communicated indirectly via an operator console of the medical imaging system 50 in communication with the centralized controller or remote computing device. In certain embodiments, the feedback from the smart sensors is communicated directly to the centralized controller or remote computing device. In certain embodiments, the feedback is a measurement of or data related to a parameter or condition. In certain embodiments, the feedback is an alarm signal indicating a condition or a parameter exceeding a respective threshold. The method 106 includes utilizing the received feedback in monitoring the medical imaging systems (block 108).

The method 106 further includes scheduling or adjusting scheduling of service or maintenance for each medical imaging system based on the feedback received from the one or more smart sensors of each respective medical imaging system (block 112). In certain embodiments, the method 106 includes predicting failure of a specific component or part of a respective medical imaging system 50 based on the feedback received from the respective smart sensors 52 of the respective medical imaging system 50 (block 114). In certain embodiments, the received feedback may be utilized by machine learning modules for predictive maintenance. The method 106 includes scheduling service to replace the specific component or part of the respective medical imaging system 50 prior to failure of the specific component (block 122).

The method 106 even further includes providing an alert or a notification based on the received feedback (block 116). The alert or notification may be provided to the operator console of the respective medical imaging system that the alert or notification relates to or a separate computing device (e.g., at a facility where the respective medical imaging system is located). In certain embodiments, the centralized controller is configured to generate an alarm based on a comparison of a received measured parameter or condition to a corresponding threshold where the threshold is exceeded. In certain embodiments, a shutdown signal may be sent to turn off the imaging system (e.g., in response to smoke or fire). In certain embodiments, a notification may be provided to indicate a condition (e.g., animal detected, oil leak, vibration, incorrectly leveled gantry-table, etc.).

Figure 10:
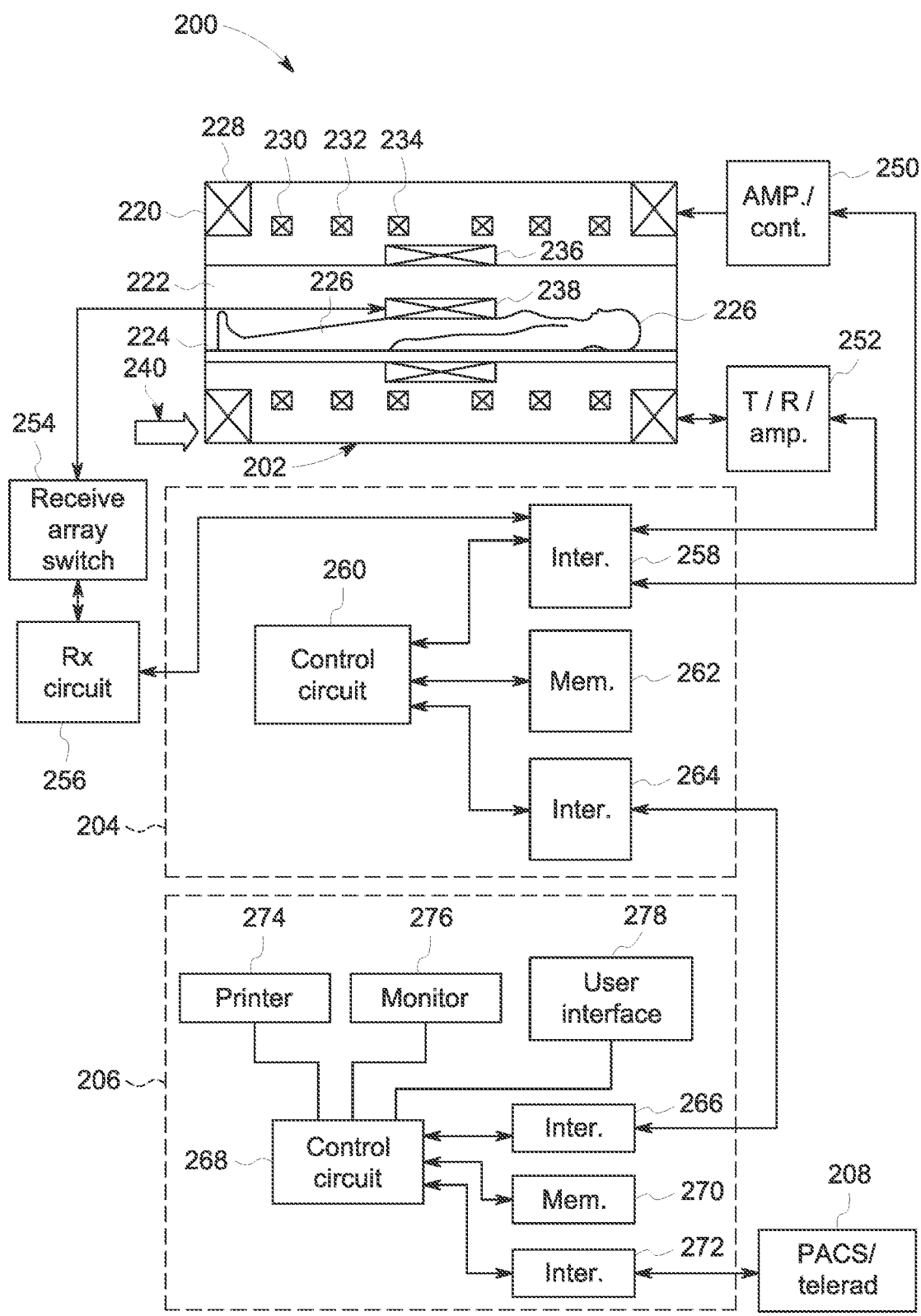
FIG. 10 is a schematic view of a magnetic resonance imaging (MRI) system suitable for use with the disclosed techniques.
Figure 11:
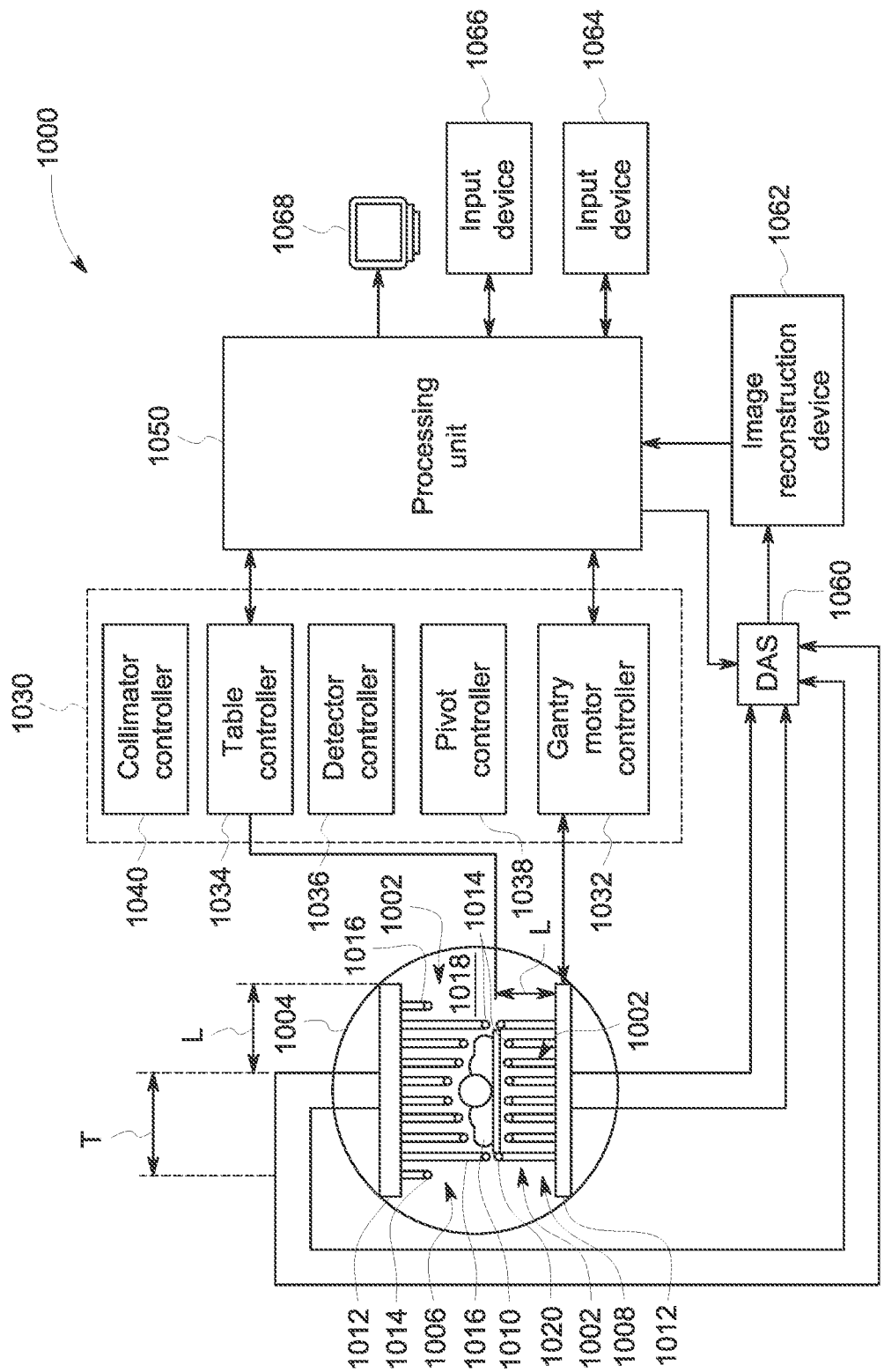
FIG. 11 is a schematic view of nuclear medicine imaging system suitable for use with the disclosed techniques.

FIGS. 10 and 11 illustrate other types of medical imaging systems that may be utilized with the techniques described in the present disclosure. FIG. 10 is a magnetic resonance imaging (MRI) system 200 is illustrated schematically as including a scanner 202, scanner control circuitry 204, and system control circuitry 206. According to the embodiments described herein, the MRI system 200 is generally configured to perform MR imaging.

System 200 additionally includes remote access and storage systems or devices such as picture archiving and communication systems (PACS) 208, or other devices such as teleradiology equipment so that data acquired by the system 200 may be accessed on- or off-site. In this way, MR data may be acquired, followed by on- or off-site processing and evaluation. While the MRI system 200 may include any suitable scanner or detector, in the illustrated embodiment, the system 200 includes a full body scanner 202 having a housing 220 through which a bore 222 is formed. A table 224 is moveable into the bore 222 to permit a patient 226 (e.g., subject) to be positioned therein for imaging selected anatomy within the patient.

Scanner 202 includes a series of associated coils for producing controlled magnetic fields for exciting the gyromagnetic material within the anatomy of the patient being imaged. Specifically, a primary magnet coil 228 is provided for generating a primary magnetic field, $B_0$, which is generally aligned with the bore 222. A series of gradient coils 230, 232, and 234 permit controlled magnetic gradient fields to be generated for positional encoding of certain gyromagnetic nuclei within the patient 226 during examination sequences. A radio frequency (RF) coil 236 (e.g., RF transmit coil) is configured to generate radio frequency pulses for exciting the certain gyromagnetic nuclei within the patient. In addition to the coils that may be local to the scanner 202, the system 200 also includes a set of receiving coils or RF receiving coils 238 (e.g., an array of coils) configured for placement proximal (e.g., against) to the patient 226. As an example, the receiving coils 238 can include cervical/thoracic/lumbar (CTL) coils, head coils, single-sided spine coils, and so forth. Generally, the receiving coils 238 are placed close to or on top of the patient 226 so as to receive the weak RF signals (weak relative to the transmitted pulses generated by the scanner coils) that are generated by certain gyromagnetic nuclei within the patient 226 as they return to their relaxed state.

The various coils of system 200 are controlled by external circuitry to generate the desired field and pulses, and to read emissions from the gyromagnetic material in a controlled manner. In the illustrated embodiment, a main power supply 240 provides power to the primary field coil 228 to generate the primary magnetic field, $B_0$. A power input (e.g., power from a utility or grid), a power distribution unit (PDU), a power supply (PS), and a driver circuit 250 may together provide power to pulse the gradient field coils 230, 232, and 234. The driver circuit 250 may include amplification and control circuitry for supplying current to the coils as defined by digitized pulse sequences output by the scanner control circuitry 204.

Another control circuit 252 is provided for regulating operation of the RF coil 236. Circuit 252 includes a switching device for alternating between the active and inactive modes of operation, wherein the RF coil 236 transmits and does not transmit signals, respectively. Circuit 252 also includes amplification circuitry configured to generate the RF pulses. Similarly, the receiving coils 238 are connected to switch 254, which is capable of switching the receiving coils 238 between receiving and non-receiving modes. Thus, the receiving coils 238 resonate with the RF signals produced by relaxing gyromagnetic nuclei from within the patient 226 while in the receiving mode, and they do not resonate with RF energy from the transmitting coils (i.e., coil 236) so as to prevent undesirable operation while in the non-receiving mode. Additionally, a receiving circuit 256 is configured to receive the data detected by the receiving coils 238 and may include one or more multiplexing and/or amplification circuits.

It should be noted that while the scanner 202 and the control/amplification circuitry described above are illustrated as being coupled by a single line, many such lines may be present in an actual instantiation. For example, separate lines may be used for control, data communication, power transmission, and so on. Further, suitable hardware may be disposed along each type of line for the proper handling of the data and current/voltage. Indeed, various filters, digitizers, and processors may be disposed between the scanner and either or both of the scanner and system control circuitry 204, 206.

As illustrated, scanner control circuitry 204 includes an interface circuit 258, which outputs signals for driving the gradient field coils and the RF coil and for receiving the data representative of the magnetic resonance signals produced in examination sequences. The interface circuit 258 is coupled to a control and analysis circuit 260. The control and analysis circuit 260 executes the commands for driving the circuit 250 and circuit 252 based on defined protocols selected via system control circuit 206.

Control and analysis circuit 260 also serves to receive the magnetic resonance signals and performs subsequent processing before transmitting the data to system control circuit 206. Scanner control circuit 204 also includes one or more memory circuits 262, which store configuration parameters, pulse sequence descriptions, examination results, and so forth, during operation.

Interface circuit 264 is coupled to the control and analysis circuit 260 for exchanging data between scanner control circuitry 204 and system control circuitry 206. In certain embodiments, the control and analysis circuit 260, while illustrated as a single unit, may include one or more hardware devices. The system control circuit 206 includes an interface circuit 266, which receives data from the scanner control circuitry 204 and transmits data and commands back to the scanner control circuitry 204. The control and analysis circuit 268 may include a CPU in a multi-purpose or application specific computer or workstation. Control and analysis circuit 268 is coupled to a memory circuit 270 to store programming code for operation of the MRI system 200 and to store the processed image data for later reconstruction, display and transmission. The programming code may execute one or more algorithms that, when executed by a processor, are configured to perform reconstruction of acquired data as described below. In certain embodiments, image reconstruction may occur on a separate computing device having processing circuitry and memory circuitry.

An additional interface circuit 272 may be provided for exchanging image data, configuration parameters, and so forth with external system components such as remote access and storage devices 208. Finally, the system control and analysis circuit 268 may be communicatively coupled to various peripheral devices for facilitating operator interface and for producing hard copies of the reconstructed images. In the illustrated embodiment, these peripherals include a printer 274, a monitor 276, and user interface 278 including devices such as a keyboard, a mouse, a touchscreen (e.g., integrated with the monitor 276), and so forth.

FIG. 11 is a schematic illustration of a NM imaging system 1000 having a plurality of imaging detector head assemblies mounted on a gantry (which may be mounted, for example, in rows, in an iris shape, or other configurations, such as a configuration in which the movable detector carriers 1016 are aligned radially toward the patient-body 1010). It should be noted that the arrangement of FIG. 11 is provided by way of example for illustrative purposes, and that other arrangements (e.g., detector arrangements) may be employed in various embodiments. In the illustrated example, a plurality of imaging detectors 1002 are mounted to a gantry 1004. In the illustrated embodiment, the imaging detectors 1002 are configured as two separate detector arrays 1006 and 1008 coupled to the gantry 1004 above and below a subject 1010 (e.g., a patient), as viewed in FIG. 11. The detector arrays 1006 and 1008 may be coupled directly to the gantry 1004, or may be coupled via support members 1012 to the gantry 1004 to allow movement of the entire arrays 1006 and/or 1008 relative to the gantry 1004 (e.g., transverse translating movement in the left or right direction as viewed by arrow T in FIG. 11). Additionally, each of the imaging detectors 1002 includes a detector unit 1014, at least some of which are mounted to a movable detector carrier 1016 (e.g., a support arm or actuator that may be driven by a motor to cause movement thereof) that extends from the gantry 1004. In some embodiments, the detector carriers 1016 allow movement of the detector units 1014 towards and away from the subject 1010, such as linearly. Thus, in the illustrated embodiment the detector arrays 1006 and 1008 are mounted in parallel above and below the subject 1010 and allow linear movement of the detector units 1014 in one direction (indicated by the arrow L), illustrated as perpendicular to the support member 1012 (that are coupled generally horizontally on the gantry 1004). However, other configurations and orientations are possible as described herein. It should be noted that the movable detector carrier 1016 may be any type of support that allows movement of the detector units 1014 relative to the support member 1012 and/or gantry 1004, which in various embodiments allows the detector units 1014 to move linearly towards and away from the support member 1012.

Each of the imaging detectors 1002 in various embodiments is smaller than a conventional whole body or general-purpose imaging detector. A conventional imaging detector may be large enough to image most or all of a width of a patient's body at one time and may have a diameter or a larger dimension of approximately 50 cm or more. In contrast, each of the imaging detectors 1002 may include one or more detector units 1014 coupled to a respective detector carrier 1016 and having dimensions of, for example, 4 cm to 20 cm and may be formed of Cadmium Zinc Telluride (CZT) tiles or modules. For example, each of the detector units 1014 may be 8×8 cm in size and be composed of a plurality of CZT pixelated modules (not shown). For example, each module may be 4×4 cm in size and have 16×16=256 pixels (pixelated anodes). In some embodiments, each detector unit 1014 includes a plurality of modules, such as an array of 1×7 modules. However, different configurations and array sizes are contemplated including, for example, detector units 1014 having multiple rows of modules.

It should be understood that the imaging detectors 1002 may be different sizes and/or shapes with respect to each other, such as square, rectangular, circular or other shape. An actual field of view (FOV) of each of the imaging detectors 1002 may be directly proportional to the size and shape of the respective imaging detector.

The gantry 1004 may be formed with an aperture 1018 (e.g., opening or bore) therethrough as illustrated. A patient table 1020, such as a patient bed, is configured with a support mechanism (not shown) to support and carry the subject 1010 in one or more of a plurality of viewing positions within the aperture 1018 and relative to the imaging detectors 1002. Alternatively, the gantry 1004 may comprise a plurality of gantry segments (not shown), each of which may independently move a support member 1012 or one or more of the imaging detectors 1002.

The gantry 1004 may also be configured in other shapes, such as a "C", "H" and "L", for example, and may be rotatable about the subject 1010. For example, the gantry 1004 may be formed as a closed ring or circle, or as an open arc or arch which allows the subject 1010 to be easily accessed while imaging and facilitates loading and unloading of the subject 1010, as well as reducing claustrophobia in some subjects 1010.

Additional imaging detectors (not shown) may be positioned to form rows of detector arrays or an arc or ring around the subject 1010. By positioning multiple imaging detectors 1002 at multiple positions with respect to the subject 1010, such as along an imaging axis (e.g., head to toe direction of the subject 1010) image data specific for a larger FOV may be acquired more quickly. Each of the imaging detectors 1002 has a radiation detection face, which is directed towards the subject 1010 or a region of interest within the subject.

A controller unit 1030 may control the movement and positioning of the patient table 1020, imaging detectors 1002 (which may be configured as one or more arms), and/or gantry 1004. A range of motion before or during an acquisition, or between different image acquisitions, is set to maintain the actual FOV of each of the imaging detectors 1002 directed, for example, towards or "aimed at" a particular area or region of the subject 1010 or along the entire subject 1010. The motion may be a combined or complex motion in multiple directions simultaneously, concurrently, or sequentially.

The controller unit 1030 may have a gantry motor controller 1032, table controller 1034, detector controller 1036, pivot controller 1038, and collimator controller 1040. The controllers 1030, 1032, 1034, 1036, 1038, and 1040 may be automatically commanded by a processing unit 1050, manually controlled by an operator, or a combination thereof. The gantry motor controller 1032 may move the imaging detectors 1002 with respect to the subject 1010, for example, individually, in segments or subsets, or simultaneously in a fixed relationship to one another. For example, in some embodiments, the gantry controller 1032 may cause the imaging detectors 1002 and/or support members 1012 to move relative to or rotate about the subject 1010, which may include motion of less than or up to 180 degrees (or more).

The table controller 1034 may move the patient table 1020 to position the subject 1010 relative to the imaging detectors 1002. The patient table 1020 may be moved in up-down directions, in-out directions, and right-left directions, for example. The detector controller 1036 may control movement of each of the imaging detectors 1002 to move together as a group or individually. The detector controller 1036 also may control movement of the imaging detectors 1002 in some embodiments to move closer to and farther from a surface of the subject 1010, such as by controlling translating movement of the detector carriers 1016 linearly towards or away from the subject 1010 (e.g., sliding or telescoping movement). Optionally, the detector controller 1036 may control movement of the detector carriers 1016 to allow movement of the detector array 1006 or 1008. For example, the detector controller 1036 may control lateral movement of the detector carriers 1016 illustrated by the T arrow. In various embodiments, the detector controller 1036 may control the detector carriers 1016 or the support members 1012 to move in different lateral directions. Detector controller 1036 may control the swiveling motion of detectors 1002 together. In some embodiments, detectors 1002 may swivel or rotate around an axis.

The pivot controller 1038 may control pivoting or rotating movement of the detector units 1014 at ends of the detector carriers 1016 and/or pivoting or rotating movement of the detector carrier 1016. For example, one or more of the detector units 1014 or detector carriers 1016 may be rotated about at least one axis to view the subject 1010 from a plurality of angular orientations to acquire, for example, 3D image data in a 3D SPECT or 3D imaging mode of operation. The collimator controller 1040 may rotate a detector column between two different collimators configured for two different energy applications (e.g., high energy versus low energy).

It should be noted that motion of one or more imaging detectors 1002 may be in directions other than strictly axially or radially, and motions in several motion directions may be used in various embodiment. Therefore, the term "motion controller" may be used to indicate a collective name for all motion controllers. It should be noted that the various controllers may be combined, for example, the detector controller 1036 and pivot controller 1038 may be combined to provide the different movements described herein.

Prior to acquiring an image of the subject 1010 or a portion of the subject 1010, the imaging detectors 1002, gantry 1004, and/or patient table 1020 may be adjusted, such as to first or initial imaging positions, as well as subsequent imaging positions. The imaging detectors 1002 may each be positioned to image a portion of the subject 1010. Alternatively, for example in a case of a small size subject 1010, one or more of the imaging detectors 1002 may not be used to acquire data, such as the imaging detectors 1002 at ends of the detector array 1006 and 1008, which as illustrated in FIG. 11 are in a retracted position away from the subject 1010. Positioning may be accomplished manually by the operator and/or automatically, which may include using, for example, image information such as other images acquired before the current acquisition, such as by another imaging modality such as X-ray Computed Tomography (CT), MRI, X-Ray, PET or ultrasound. In some embodiments, the additional information for positioning, such as the other images, may be acquired by the same system, such as in a hybrid system (e.g., a SPECT/CT system). Additionally, the detector units 1014 may be configured to acquire non-NM data, such as X-ray CT data. In some embodiments, a multi-modality imaging system may be provided, for example, to allow performing NM or SPECT imaging, as well as X-ray CT imaging, which may include a dual-modality or gantry design as described in more detail herein.

After the imaging detectors 1002, gantry 1004, and/or patient table 1020 are positioned, one or more images, such as three-dimensional (3D) SPECT images are acquired using one or more of the imaging detectors 1002, which may include using a combined motion that reduces or minimizes spacing between detector units 1014. The image data acquired by each imaging detector 1002 may be combined and reconstructed into a composite image or 3D images in various embodiments.

In one embodiment, at least one of detector arrays 1006 and/or 1008, gantry 1004, and/or patient table 1020 are moved after being initially positioned, which includes individual movement of one or more of the detector units 1014 (e.g., combined lateral and pivoting movement) together with the swiveling motion of detectors 1002. For example, at least one of detector arrays 1006 and/or 1008 may be moved laterally while pivoted. Thus, in various embodiments, a plurality of small sized detectors, such as the detector units 1014 may be used for 3D imaging, such as when moving or sweeping the detector units 1014 in combination with other movements.

In various embodiments, a data acquisition system (DAS) 1060 receives electrical signal data produced by the imaging detectors 1002 and converts this data into digital signals for subsequent processing. However, in various embodiments, digital signals are generated by the imaging detectors 1002. An image reconstruction device 1062 (which may be a processing device or computer) and a data storage device 1064 may be provided in addition to the processing unit 1050. It should be noted that one or more functions related to one or more of data acquisition, motion control, data processing and image reconstruction may be accomplished through hardware, software and/or by shared processing resources, which may be located within or near the imaging system 1000, or may be located remotely. Additionally, a user input device 1066 may be provided to receive user inputs (e.g., control commands), as well as a display 1068 for displaying images. DAS 1060 receives the acquired images from detectors 1002 together with the corresponding lateral, vertical, rotational and swiveling coordinates of gantry 1004, support members 1012, detector units 1014, detector carriers 1016, and detectors 1002 for accurate reconstruction of an image including 3D images and their slices.

Technical effects of the disclosed embodiments include providing smart maintenance instead of periodic maintenance. Another technical effect includes providing reduced service cost and less downtime for each medical imaging system. A further technical effect includes providing monitoring and service (or maintenance) scheduling at a centralized location. The centralized monitoring location will have access to the system using data and part failure data which will enable better troubleshooting in case any or additional parts fail. An even further technical effect includes enabling a service provider to more effectively manage resources for servicing a plurality of medical imaging systems.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computed tomography (CT) imaging system, comprising:
   a gantry having a bore, rotatable about an axis of rotation;
   a table configured to move a subject to be imaged into and out of the bore of the gantry;
   a radiation source mounted on the gantry and configured to emit an X-ray beam; and
   a detector configured to detect the X-ray beam emitted by the radiation source;
   one or more smart sensors integrated with one or more components of the CT imaging system, wherein the one or more smart sensors are configured to monitor for one or more conditions related to the CT imaging system; and a controller configured to receive feedback from the one or more smart sensors and to schedule or to adjust scheduling of service on the CT imaging system based on the feedback from the one or more smart sensors; and wherein the CT imaging system comprises a gantry housing, wherein the one or more smart sensors comprise an animal presence sensor disposed within the gantry housing, and the animal presence sensor is configured to detect a presence of an animal within the gantry housing.

2. The CT imaging system of claim 1, wherein the one or more smart sensors comprise a plurality of smart sensors integrated within the one or more components of the CT imaging system, and the plurality of smart sensors are configured to monitor for a plurality of different conditions related to the CT imaging system.

3. The CT imaging system of claim 1, wherein the one or more smart sensors comprise a dust accumulation sensor disposed within the gantry housing or the table, and the dust accumulation sensor is configured to measure an accumulation of dust within the gantry housing or the table and to provide an alert signal to the controller when the accumulation of dust exceeds a predefined dust accumulation threshold.

4. The CT imaging system of claim 1, wherein the animal presence sensor comprises a passive infrared motion sensor configured to detect movement of the animal within the gantry housing.

5. The CT imaging system of claim 1, wherein the CT imaging system comprises a deterrent system disposed within the gantry housing and configured to provide a deterrent to cause the animal to leave the gantry housing, wherein the animal presence sensor is configured to provide a signal to cause the deterrent system to provide the deterrent in response to detecting the presence of the animal within the gantry housing.

6. The CT imaging system of claim 5, wherein the deterrent system comprises an ultrasound transducer configured to emit ultrasound waves to cause the animal to leave the gantry housing.

7. The CT imaging system of claim 5, wherein the deterrent system comprises a light emitting system configured to emit light to cause the animal to leave the gantry housing.

8. The CT imaging system of claim 1, wherein the animal presence sensor is configured to provide an alert signal to the controller in response to detecting the presence of the animal within the gantry housing.

9. The CT imaging system of claim 1, wherein the one or more smart sensors comprise both a smoke sensor and a fire sensor disposed within the gantry housing, wherein the smoke sensor is configured to detect a presence of smoke within the gantry housing, the fire sensor is configured to detect a presence of a flame within the gantry housing, and to provide an alert signal to the controller in response to detecting either the smoke or the flame within the gantry housing.

10. The CT imaging system of claim 9, wherein the controller is configured to provide a signal to cause the CT imaging system to be turned off in response to the alert signal.

11. The CT imaging system of claim 1, wherein the one or more smart sensors comprise an oil leak sensor disposed within the gantry housing, and the oil leak sensor is configured to detect a presence of an oil leak within the gantry housing and to provide an alert signal to the controller in response to detecting the oil leak within the gantry housing.

12. The CT imaging system of claim 11, wherein the oil leak sensor comprises an optically-based oil leak sensor or an oil leak sensing cable.

13. The CT imaging system of claim 1, wherein the one or more smart sensors comprise digital inclinometers integrated on both the gantry housing and the table, the digital inclinometers are configured to determine if both the gantry housing and the table are level relative to a surface where the CT imaging system is located on, and the digital inclinometers are configured to provide an alert signal to the controller in response to determining that either the gantry housing or the table is not level relative to the surface.

14. A computed tomography (CT) imaging system, comprising:

a gantry having a bore, rotatable about an axis of rotation;

a table configured to move a subject to be imaged into and out of the bore of the gantry;

a radiation source mounted on the gantry and configured to emit an X-ray beam; and a detector configured to detect the X-ray beam emitted by the radiation source;

one or more smart sensors integrated with one or more components of the CT imaging system, wherein the one or more smart sensors are configured to monitor for one or more conditions related to the CT imaging system; and a controller configured to receive feedback from the one or more smart sensors and to schedule or to adjust scheduling of service on the CT imaging system based on the feedback from the one or more smart sensors; and wherein the one or more smart sensors comprise both a smoke sensor and a fire sensor disposed within the gantry housing, wherein the smoke sensor is configured to detect a presence of smoke within the gantry housing, the fire sensor is configured to detect a presence of a flame within the gantry housing, and to provide an alert signal to the controller in response to detecting either the smoke or the flame within the gantry housing.

15. A computed tomography (CT) imaging system, comprising:

a gantry having a bore, rotatable about an axis of rotation;

a table configured to move a subject to be imaged into and out of the bore of the gantry;

a radiation source mounted on the gantry and configured to emit an X-ray beam; and a detector configured to detect the X-ray beam emitted by the radiation source;

one or more smart sensors integrated with one or more components of the CT imaging system, wherein the one or more smart sensors are configured to monitor for one or more conditions related to the CT imaging system; and a controller configured to receive feedback from the one or more smart sensors and to schedule or to adjust scheduling of service on the CT imaging system based on the feedback from the one or more smart sensors; and wherein the one or more smart sensors comprise an oil leak sensor disposed within the gantry housing, and the oil leak sensor is configured to detect a presence of an oil leak within the gantry housing and to provide an alert signal to the controller in response to detecting the oil leak within the gantry housing.

\* \* \* \* \*